Nov. 9, 1948.    S. B. ROW ET AL    2,453,345
FILTERING APPARATUS
Filed June 28, 1945

INVENTORS
Stuart B. Row
Edward L. Woolley
BY Carl A. Castellan
atty.

Patented Nov. 9, 1948

2,453,345

UNITED STATES PATENT OFFICE 2,453,345

FILTERING APPARATUS

Stuart B. Row, Roanoke, Va., and Edward L. Woolley, Morton, Pa., assignors to American Viscose Corporation, Wilmington, Del., a corporation of Delaware Application June 28, 1945, Serial No. 602,054

11 Claims. (Cl. 210—144)

This invention relates to filtering apparatus and is particularly concerned with an improved launder to be arranged above the filter bed of a filter system adapted to be cleaned by passing a fluid such as water or a mixture of air and water through the bed in a direction the reverse of that during normal filtering operations.

The reverse-flow backwashing of filter beds is frequently accompanied by the loss of some of the material making up the filter bed, or the use of large quantities of backwash water and long periods of washing time in order to prevent the loss of filter bed material. When sand is used as the material, the washing of the bed is generally accomplished by mechanical agitation of the bed or by surface washing in order to avoid the use of a high velocity backwash liquid with consequent loss of bed material. However, when filter bed materials of lower density, such as anthracite coal, are desired for the filter, mechanical agitation is not as suitable, because of the brittleness of the coal and its tendency to be reduced in size by such methods. In addition, because of its lower density, a greater loss of material is liable to occur when using high velocity backwashing methods.

In accordance with the present invention, backwashing at high velocity can be accomplished without any appreciable loss in filter bed material except for undesirable fines, and with as much as a 75% reduction in the amount of water used and a corresponding reduction in filter-washing time, even when using low density filter bed material such as anthracite coal. These results are obtained by a special construction of launder above the filter bed for discharging the backwash fluid. More specific objects and advantages of the invention will be apparent from the drawing and the description thereof hereinafter.

In the drawing, which is illustrative of preferred embodiments of the invention—

Figure 1:
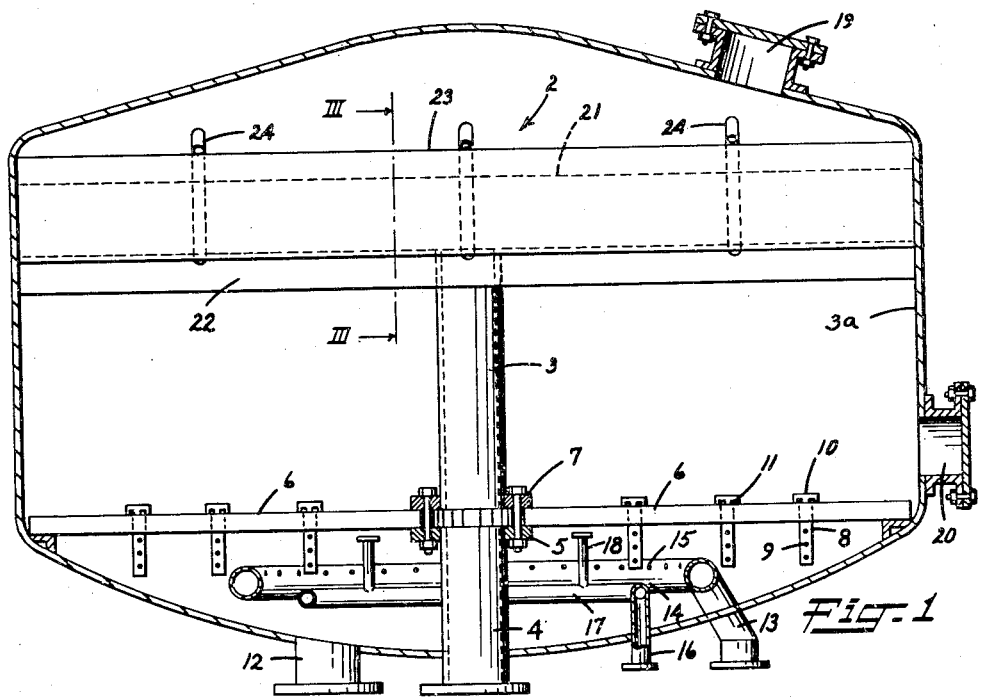
Figure 1 is an elevation of an enclosed filter comprising a preferred embodiment of the invention, with the filter vessel and parts other than the launder shown in cross-section.

The launder generally indicated by the reference character 2 is carried at the top of a pipe 3 within a filter chamber or vessel 3a, which is entirely enclosed, so that filtration may be performed under pressure. It should be understood, however, that the invention is equally applicable to filter systems which are open above their beds. A central pipe 4 communicates with the pipe 3 and has a flange 5 adapted to support the filter bed-supporting floor 6 which may advantageously take the form of a plurality of sector-shaped plates. The pipe 3 has a flange 7 adapted to be secured to the flange 5 thereby to clamp the plates 6 in place. If desired, welding or lead burning or suitable gaskets may be resorted to to effect a seal between the channel formed by pipes 3 and 4 and the surrounding regions in the filter vessel 3a. Pipes 8 extend through suitable apertures in the plates 6 and are perforated at 9 below the plates and are provided with caps 10 having lateral outlets 11 for distributing wash liquid along the base of the filter bed or for receiving the liquid being filtered from the very base of the filter bed. A coupling 12 communicating with the region of the vessel 3a below the floor 6 serves to remove the filtrate. A connection 13 extends into the vessel 3a and connects with a ring-shaped header 14 provided with suitable discharge orifices 15 for introducing the backwash liquid below the floor 6. Another connection 16 extends into the vessel 3a and communicates with a ring-shaped header 17 having upwardly extending branches 18 for introducing air or other gaseous medium into the region of vessel 3a immediately below the floor 6. Suitable manholes 19 and 20 may be provided to facilitate entrance for maintenance purposes.

Figure 2:
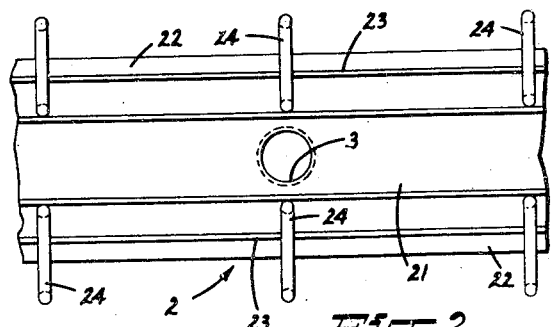
Figure 2 is a plan view of a central portion of the launder.
Figure 3:
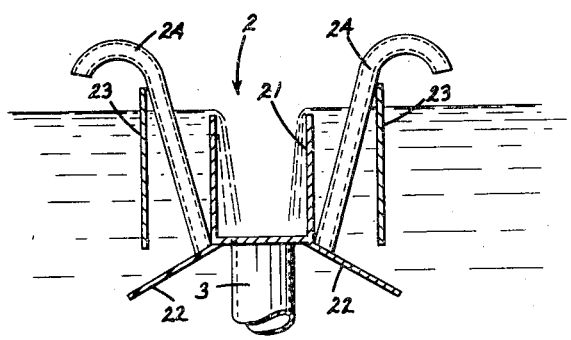
Figure 3 is a section taken on line 3—3 of Figure 1.

Referring more particularly to Figures 2 and 3, the specific form of launder shown in Figure 1 comprises a longitudinal trough 21 extending across the vessel 3a and into the bottom of which the pipe 3 opens. The lateral baffle plates 22 are provided below the trough 21 and slope downwardly from points near the bottom edges of the trough 21. The slope of the baffles 22 is selected to be sufficient to allow the material of the filter bed to slide back down into the filter bed even during washing operations. Spaced from each side of the trough 21 there is provided an outer baffle 23 with its lower edge spaced above the adjacent sloped baffles 22 and with its upper edge well above the upper edge of the trough 21. While the baffle 23 is shown vertical, it may be sloped considerably either way from the vertical, the important point being that its lower edge is set back from the outer edge of the sloped baffle 22 for reasons which will appear hereinafter. Pressure relief means, such as vent pipes 24 extend from the sloped baffles 22 and discharge from the region just below the floor of trough 21 and baffles 22 to points outside the baffles 23.

During backwashing, the launder operates as follows: Backwash liquid is introduced into pipe 13 and flows through pipes 8 into the base of the filter bed, upwardly through the filter bed until it reaches a height such that it overflows the upper edges of trough 21. Because baffle plates 22 extend outwardly from the lower edge of baffle plates 23, any filter bed material carried up by the wash liquid is generally carried to a region outside the baffles 23, whereas the liquid with relatively small amounts of filter bed material passes under the baffle 23 and upwardly between the adjacent wall of the trough 21 and the baffle 23 until it overflows the wall of trough 21. The region between baffle 23 and the adjacent wall of trough 21 is relatively calm and the upward velocity of the liquid therein is controlled so that it does not exceed the settling velocity of the filter bed material (excluding undesirable fines the washing away of which prevents clogging) which consequently descends in this region and slides down over the upper surfaces of baffle 22 back into the filter bed. The vents 24 serve to reduce turbulence in the vicinity of the outer edges of baffles 22 and discharge whatever is forced therethrough into a region of the filter outside baffles 23 where any solid material is allowed to descend.

Figure 4:
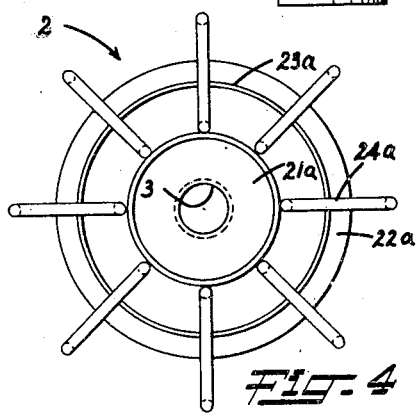
Figure 4 is a plan view of a modification.

Figure 4 embodies essentially the same arrangement except that the launder instead of extending longitudinally across the filter vessel 3a is merely disposed centrally thereof and comprises a cup-like receptacle 21a, the bottom of which communicates with the pipe 3. An outwardly sloped annular skirt or baffle plate 22a extends from adjacent the lower edge of the cup-like receptacle 21a and an annular baffle plate 23a spaced radially from the wall of the receptacle 21a and also with its lower edge above the sloped baffle 22a has its upper edge disposed above the upper edge of the wall of receptacle 21a. Vents 24a communicate with the zone beneath baffle 22a and discharge outside the baffle 23a. In operation, the launder of Figure 4 is essentially similar to that of Figures 1 to 3.

The launder functions equally as well whether a backwash liquid is alone used or the backwash is a mixture of water or other liquid with air or other gas. The backwash velocity is adjusted so that the upward velocity within the calming region between the outer wall of trough 21 or receptacle 21a and the adjacent baffle 23 or 23a respectively does not exceed the settling velocity of the particular material of which the filter bed is constructed. By utilizing the launder of the present invention, it has been found that loss of filter bed material during washing is substantially completely eliminated. Also requirements of washing time and washing fluids have been reduced as much as 75% over those heretofore needed.

It is to be understood that the description hereinabove is illustrative only and that changes and variations may be made without departing from the spirit and scope of the invention.

We claim:

1. In a filter comprising a vessel having an inlet conduit and an outlet conduit, means for supporting a filter bed in the vessel, and means below the filter bed for introducing a fluid for backwashing upwardly through the bed, a launder construction comprising a walled receptacle in the vessel, means for supporting the receptacle above the filter bed, said receptacle being open for communication with the region therearound adjacent an upper level in the receptacle and an upper level in the vessel, said receptacle having an outlet conduit for discharge of backwashed material, sloped baffle means extending downwardly and outwardly from the receptacle, additional baffle means outside the receptacle and spaced therefrom having an upper rim above the level of communication of the receptacle with its surrounding region and a lower edge spaced above, and inwardly from the outer edge of, the sloped baffle means and below the level of communication between the receptacle and its surrounding region.

2. In a filter comprising a vessel having an inlet conduit and an outlet conduit means for supporting a filter bed in the vessel, and means below the filter bed for introducing a fluid for backwashing upwardly through the bed, a launder construction comprising a walled receptacle in the vessel, means for supporting the receptacle above the filter bed, said receptacle being open for communication with the region therearound adjacent an upper level in the receptacle and an upper level in the vessel, said receptacle having an outlet conduit for discharge of backwashed material, sloped baffle means extending downwardly and outwardly from the receptacle, additional baffle means outside the receptacle and spaced therefrom having an upper rim above the level of communication of the receptacle with its surrounding region and a lower edge spaced above, and inwardly from the outer edge of, the sloped baffle means and below the level of communication between the receptacle and its surrounding region, and pressure relief means communicating with a region below the sloped baffle means and with a more elevated region outside the additional baffle means.

3. In a filter comprising a vessel having an inlet conduit and an outlet conduit, means for supporting a filter bed in the vessel, and means below the filter bed for introducing a fluid for backwashing upwardly through the bed, a launder construction comprising a walled receptacle in the vessel, means for supporting the receptacle above the filter bed, said receptacle being open for communication with the region therearound adjacent an upper level in the receptacle and an upper level in the vessel, said receptacle having an outlet conduit for discharge of backwashed material, sloped baffle means extending downwardly and outwardly from the receptacle, additional baffle means outside the receptacle and spaced therefrom having an upper rim above the level of communication of the receptacle with its surrounding region and a lower edge spaced above, and inwardly from the outer edge of, the sloped baffle means and below the level of communication between the receptacle and its surrounding region, and venting means communicating with a region below the sloped baffle means and with a more elevated region above the liquid level in the vessel outside the additional baffle means.

4. In a filter comprising a vessel having an inlet conduit and an outlet conduit, means for supporting a filter bed in the vessel, and means below the filter bed for introducing a fluid for backwashing upwardly through the bed, a launder construction comprising a walled receptacle open at the top and disposed in the vessel, means for supporting the receptacle above the filter bed, said receptacle having an outlet conduit for discharge of backwashed material, sloped baffle means extending downwardly and outwardly from a lower portion of the receptacle, additional upwardly extending baffle means outside the receptacle and spaced therefrom having an upper rim extending above the receptacle and a lower edge spaced above, and inwardly from the outer edge of, the sloped baffle means and below the upper rim of the receptacle.

5. In a filter comprising a vessel having an inlet conduit and an outlet conduit, means for supporting a filter bed in the vessel, and means below the filter bed for introducing a fluid for backwashing upwardly through the bed, a launder construction comprising a walled receptacle open at the top and disposed in the vessel, means for supporting the receptacle above the filter bed, said receptacle having an outlet conduit for discharge of backwashed material, sloped baffle means extending downwardly and outwardly from a lower portion of the receptacle, additional approximately vertically upwardly extending baffle means outside the receptacle and spaced therefrom having an upper rim extending above the receptacle and a lower edge spaced above, and inwardly from the outer edge of, the sloped baffle means and below the upper rim of the receptacle.

6. In a filter comprising a vessel having an inlet conduit and an outlet conduit, means for supporting a filter bed in the vessel, and means below the filter bed for introducing a fluid for backwashing upwardly through the bed, a launder construction comprising a trough in the vessel, means for supporting the trough above the filter bed, an outlet conduit connected to the trough, a sloped baffle plate extending downwardly and outwardly from a lower portion of each side wall of the trough, an additional baffle plate on each side of the trough and each being spaced therefrom with its upper rim extending higher than the adjacent side wall of the trough and its lower edge spaced above, and inwardly from the outer edge of, the adjacent sloped baffle plate and below the upper rim of the trough.

7. In a filter comprising a vessel having an inlet conduit and an outlet conduit, means for supporting a filter bed in the vessel, and means below the filter bed for introducing a fluid for backwashing upwardly through the bed, a launder construction comprising a trough in the vessel, means for supporting the trough above the filter bed, an outlet conduit connected to the trough, a sloped baffle plate extending downwardly and outwardly from a lower portion of each side wall of the trough, an additional baffle plate on each side of the trough and each being spaced therefrom with its upper rim extending higher than the adjacent side wall of the trough and its lower edge spaced above the adjacent sloped baffle plate and below the upper rim of the trough, and a plurality of venting pipes communicating with the region immediately below each sloped baffle plate and being arranged to discharge to a more elevated region above the upper rim of the trough and outside the adjacent additional baffle plates.

8. In a filter comprising a vessel having an inlet conduit and an outlet conduit, means for supporting a filter bed in the vessel, and means below the filter bed for introducing a fluid for backwashing upwardly through the bed, a launder construction comprising a trough in the vessel, means for supporting the trough above the filter bed, an outlet conduit connected to the trough, a sloped baffle plate extending downwardly and outwardly from a lower portion of each side wall of the trough, an additional approximately vertical baffle plate on each side of the trough and each being spaced therefrom with its upper rim extending higher than the adjacent side wall of the trough and its lower edge spaced above the adjacent sloped baffle plate and below the upper rim of the trough, and a plurality of venting pipes communicating with the region immediately below each sloped baffle plate and being arranged to discharge to a more elevated region above the upper rim of the trough and outside the adjacent additional baffle plates.

9. In a filter comprising a vessel having an inlet conduit and an outlet conduit, means for supporting a filter bed in the vessel, and means below the filter bed for introducing a fluid for backwashing upwardly through the bed, a launder construction comprising a receptacle in the vessel above the filter bed and having a cylindrical wall communicating with the region therearound adjacent an upper level thereof and an upper level in the vessel, said receptacle having an outlet conduit for discharge of backwashed material, an annular sloped baffle plate extending downwardly and outwardly from a lower portion of the receptacle, an additional annular baffle plate outside the receptacle and spaced therefrom having its upper rim above the level of communication of the receptacle with its surrounding region and its lower edge spaced above the sloped baffle plate and below the level of communication between the receptacle and its surrounding region.

10. In a filter comprising a vessel having an inlet conduit and an outlet conduit, means for supporting a filter bed in the vessel, and means below the filter bed for introducing a fluid for backwashing upwardly through the bed, a launder construction comprising a receptacle in the vessel above the filter bed and having a cylindrical wall communicating with the region therearound adjacent an upper level thereof and an upper level in the vessel, said receptacle having an outlet conduit for discharge of backwashed material, an annular sloped baffle plate extending downwardly and outwardly from a lower portion of the receptacle, an additional annular baffle plate outside the receptacle and spaced therefrom having its upper rim above the level of communication of the receptacle with its surrounding region and its lower edge spaced above the sloped baffle plate and below the level of communication between the receptacle and its surrounding region, and a plurality of venting pipes communicating with the region immediately below the sloped baffle plate and arranged to discharge into a more elevated region above the upper rim of the receptacle and outside the additional baffle plate.

11. In a filter comprising a vessel having an inlet conduit and an outlet conduit, means for supporting a filter bed in the vessel, and means below the filter bed for introducing a fluid for backwashing upwardly through the bed, a launder construction comprising a receptacle in the vessel above the filter bed and having a cylindrical wall communicating with the region therearound adjacent an upper level thereof and an upper level in the vessel, said receptacle having an outlet conduit for discharge of backwashed material, an annular sloped baffle plate extending downwardly and outwardly from a lower portion of the receptacle, an additional substantially cylindrical annular baffle plate outside the receptacle and spaced therefrom having its upper rim above the level of communication of the receptacle with its surrounding region and its lower edge spaced above the sloped baffle plate and below the level of communication between the receptacle and its surrounding region, and a plurality of venting pipes communicating with the region immediately below the sloped baffles plate and arranged to discharge into a more elevated region above the upper rim of the receptacle and outside the additional baffle plate.

STUART B. ROW.
EDWARD L. WOOLLEY.

REFERENCES CITED

The following references are of record in the file of this patent:

UNITED STATES PATENTS

| Number | Name | Date |
|---|---|---|
| 798,473 | Wilson | Aug. 29, 1905 |
| 1,069,737 | Stevenson | Aug. 12, 1913 |
| 1,096,868 | Stevenson | May 19, 1914 |